*US007126585B2*

United States Patent
Davis et al.

(10) Patent No.: US 7,126,585 B2
(45) Date of Patent: Oct. 24, 2006

(54) ONE CHIP USB OPTICAL MOUSE SENSOR SOLUTION

(76) Inventors: Jeffery Davis, 353 Whisman Station Dr., Mountain View, CA (US) 94043; Michael J. Brosnan, 98350 Naba Dr., Fremont, CA (US) 34638; Thomas M. Walley, 1709 N. Taft Ave., Loveland, CO (US) 80538; Mark A. Anderson, 704 Matthews St., Fort Collins, CO (US) 80524; Brian J. Misek, 2501 Bedford Ct., Fort Collins, CO (US) 80528; Allen C. Norskog, 900 Whaler's Way, Fort Collins, CO (US) 80525

( * ) Notice: Subject to any disclaimer, the term of this patent is extended or adjusted under 35 U.S.C. 154(b) by 624 days.

(21) Appl. No.: 09/931,987

(22) Filed: Aug. 17, 2001

(65) Prior Publication Data

US 2003/0034959 A1    Feb. 20, 2003

(51) Int. Cl.
*G09G 5/08* (2006.01)
(52) U.S. Cl. .................................... 345/166
(58) Field of Classification Search ............... 345/163, 345/165, 166, 167, 161, 156; 463/36, 37, 463/38, 79; 710/62, 63; 714/724, 734, 742
See application file for complete search history.

(56) References Cited

U.S. PATENT DOCUMENTS

| | | | |
|---|---|---|---|
| 4,751,505 A * | 6/1988 | Williams et al. ............ 345/166 |
| 5,578,813 A | 11/1996 | Allen et al. | |
| 5,644,139 A | 7/1997 | Allen et al. | |
| 5,786,804 A | 7/1998 | Gordon | |
| 5,912,661 A * | 6/1999 | Siddiqui ..................... 345/166 |
| 5,994,710 A | 11/1999 | Knee et al. | |
| 6,057,540 A | 5/2000 | Gordon et al. | |
| 6,151,015 A | 11/2000 | Badyal et al. | |
| 6,256,016 B1 * | 7/2001 | Piot et al. ................... 345/166 |

OTHER PUBLICATIONS

"Seeing Eye" Mouse for a Computer System, U.S. Appl. No. 09/052,046, filed Mar. 30, 1998.

* cited by examiner

*Primary Examiner*—Chanh Nguyen

(57) ABSTRACT

An apparatus for controlling the position of a screen pointer for an electronic device having a display screen includes a light source for illuminating an imaging surface, thereby generating reflected images. The apparatus includes a single chip for receiving the reflected images, generating digital representations of the reflected images, and generating a first set of movement data based on the digital representations of the reflected images. The first set of movement data is indicative of relative motion between the chip and the imaging surface. The single chip includes a serial interface for outputting motion data in a serial format based on the movement data.

20 Claims, 5 Drawing Sheets

ONE CHIP USB OPTICAL MOUSE SENSOR SOLUTION

REFERENCE TO RELATED PATENTS

This Application is related to the subject matter described in the following U.S. patents: U.S. Pat. No. 5,578,813, filed Mar. 2, 1995, issued Nov. 26, 1996, and entitled FREEHAND IMAGE SCANNING DEVICE WHICH COMPENSATES FOR NON-LINEAR MOVEMENT; U.S. Pat. No. 5,644,139, filed Aug. 14, 1996, issued Jul. 1, 1997, and entitled NAVIGATION TECHNIQUE FOR DETECTING MOVEMENT OF NAVIGATION SENSORS RELATIVE TO AN OBJECT; and U.S. Pat. No. 5,786,804, filed Oct. 6, 1995, issued Jul. 28, 1998, and entitled METHOD AND SYSTEM FOR TRACKING ATTITUDE. These three patents describe techniques of tracking position movement. Those techniques are a component in a preferred embodiment described below. Accordingly, U.S. Pat. Nos. 5,578,813, 5,644,139, and 5,786,804 are hereby incorporated herein by reference.

This application is also related to the subject matter described in U.S. Pat. No. 6,057,540, filed Apr. 30, 1998, issued May 2, 2000, and entitled MOUSELESS OPTICAL AND POSITION TRANSLATION TYPE SCREEN POINTER CONTROL FOR A COMPUTER SYSTEM; U.S. Pat. No. 6,151,015, filed Apr. 27, 1998, issued Nov. 21, 2000, and entitled PEN LIKE COMPUTER POINTING DEVICE; and U.S. patent application Ser. No. 09/052,046, filed Mar. 30, 1998, entitled SEEING EYE MOUSE FOR A COMPUTER SYSTEM. These two related patents and patent application describe screen pointing devices based on the techniques described in U.S. Pat. Nos. 5,578,813, 5,644,139, and 5,786,804. Therefore, U.S. Pat. Nos. 6,057,540 and 6,151,015, and U.S. patent application Ser. No. 09/052,046, filed Mar. 30, 1998, entitled SEEING EYE MOUSE FOR A COMPUTER SYSTEM, are hereby incorporated herein by reference.

THE FIELD OF THE INVENTION

This invention relates generally to devices for controlling a cursor on a display screen, also known as pointing devices. This invention relates more particularly to a single chip optical pointing device.

BACKGROUND OF THE INVENTION

The use of a hand operated pointing device for use with a computer and its display has become almost universal. By far the most popular of the various devices is the conventional (mechanical) mouse, used in conjunction with a cooperating mouse pad. Centrally located within the bottom surface of the mouse is a hole through which a portion of the underside of a rubber-surfaced steel ball extends. The mouse pad is typically a closed cell foam rubber pad covered with a suitable fabric. Low friction pads on the bottom surface of the mouse slide easily over the fabric, but the rubber ball does not skid. Rather, the rubber ball rolls over the fabric as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse. The user moves the mouse as necessary to get the displayed pointer to a desired location or position. Once the pointer on the screen points at an object or location of interest, a button on the mouse is activated with the fingers of the hand holding the mouse. The activation serves as an instruction to take some action, the nature of which is defined by software in the computer.

In addition to mechanical types of pointing devices like a conventional mouse, optical pointing devices have also been developed, such as those described in the incorporated patents and patent application. In one form of an optical pointing device, rather than using a moving mechanical element like a ball in a conventional mouse, relative movement between an imaging surface, such as a finger or a desktop, and photo detectors within the optical pointing device, is optically sensed and converted into movement information.

Prior optical pointing devices have used an optical navigation sensor chip in conjunction with a micro controller. Agilent, Inc., the assignee of the present application, produces optical navigation sensor chips that are suitable for use in optical pointing devices, such as an optical mouse. Typically, the micro controller is under the design control of the mouse manufacturer. Optical navigation sensor chips optically sense movement (e.g., of an optical mouse relative to a work surface or imaging surface), and calculate and report motion information. The micro controller is typically responsible for the overall management of the mouse, including receiving motion information from the optical navigation sensor chip and reporting the motion information to the host computer (or other host device), handling all other communications with the host computer, handling universal serial bus (USB) interrupts, deciding when to turn components on/off, handling the buttons and Z wheel of the mouse, as well as other operational and regulatory functions.

It would be desirable to provide an optical screen pointing device that utilizes a single chip for gathering, processing, and outputting motion data in a serial format for direct use by a host computer or other host device.

SUMMARY OF THE INVENTION

One form of the present invention provides an apparatus for controlling the position of a screen pointer for an electronic device having a display screen. The apparatus includes a light source for illuminating an imaging surface, thereby generating reflected images. The apparatus includes a single chip for receiving the reflected images, generating digital representations of the reflected images, and generating a first set of movement data based on the digital representations of the reflected images. The first set of movement data is indicative of relative motion between the chip and the imaging surface. The single chip includes a serial interface for outputting motion data in a serial format based on the movement data.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
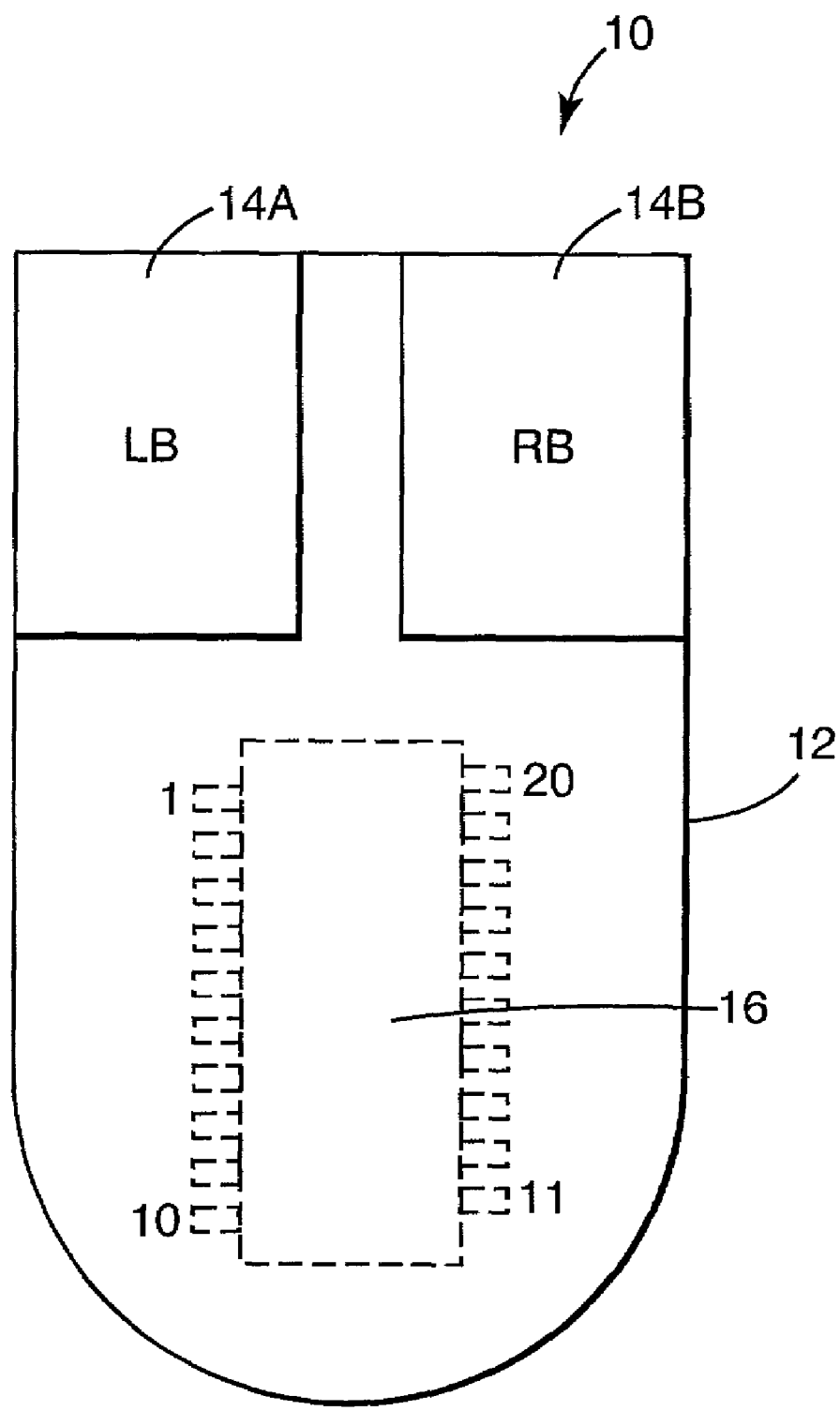
FIG. 1 is a top view of a single chip optical mouse according to one embodiment of the present invention.

FIG. 1 is a top view of a single chip optical mouse 10 according to one embodiment of the present invention. Mouse 10 includes plastic case 12, left mouse button (LB) 14A, right mouse button (RB) 14B, and optical sensor chip 16. Optical sensor chip 16 is covered by plastic case 12, and is therefore shown with dashed lines in FIG. 1. Optical sensor chip 16 is mounted on a printed circuit board (PCB) 36 (shown in FIG. 2), which is part of an internal mouse assembly 30 (shown in FIG. 2). Plastic case 12 substantially surrounds internal mouse assembly 30. Left mouse button 14A and right mouse button 14B (collectively referred to as mouse buttons 14) are coupled to two of mouse button pins 90A–90E (shown in FIG. 4) of optical sensor chip 16. In an alternative embodiment, more than two mouse buttons 14 are used in mouse 10. In another alternative embodiment, optical mouse 10 incorporates a Z wheel.

Figure 2:
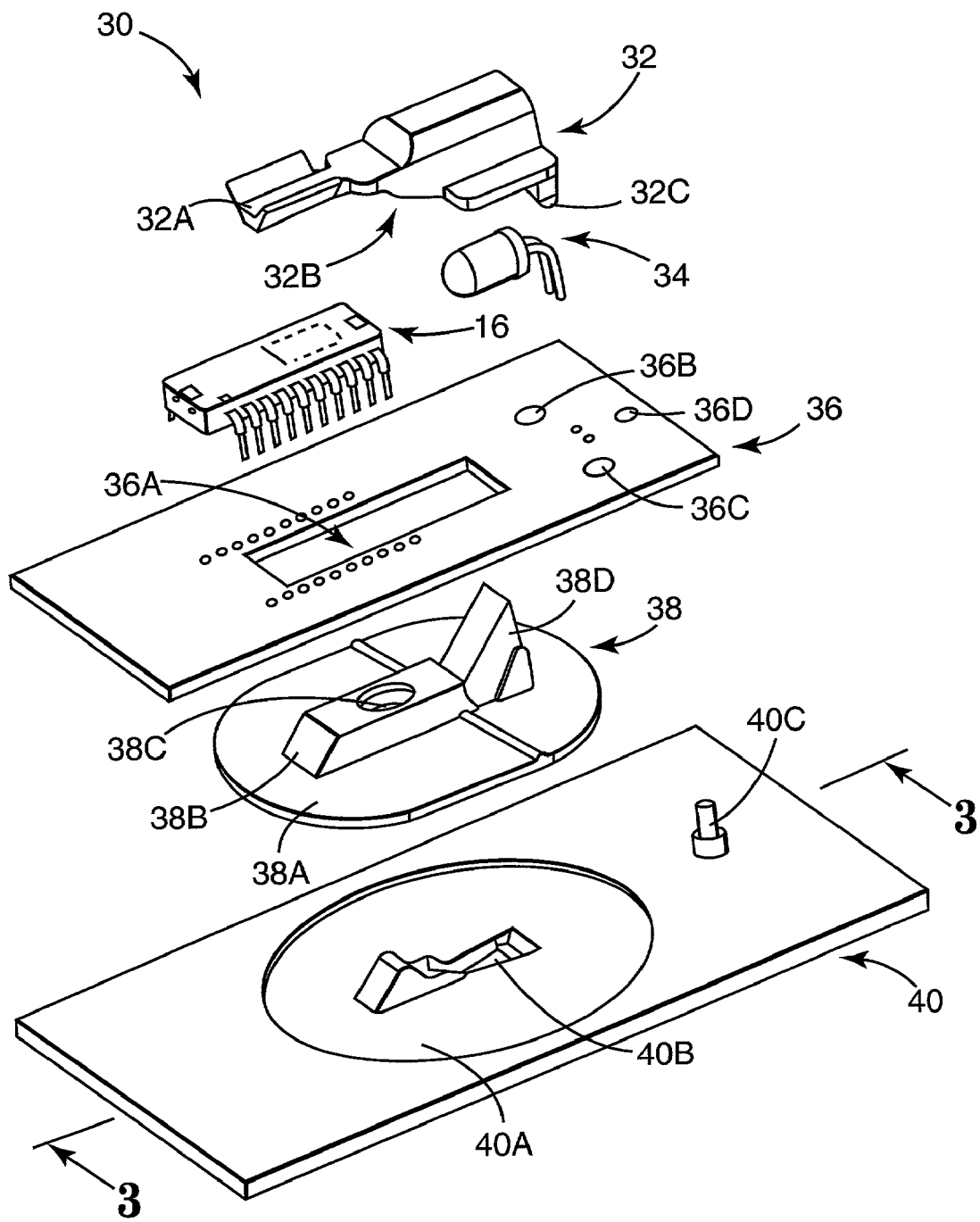
FIG. 2 is an exploded perspective view of one embodiment of an internal mouse assembly for use in an optical mouse.
Figure 3:
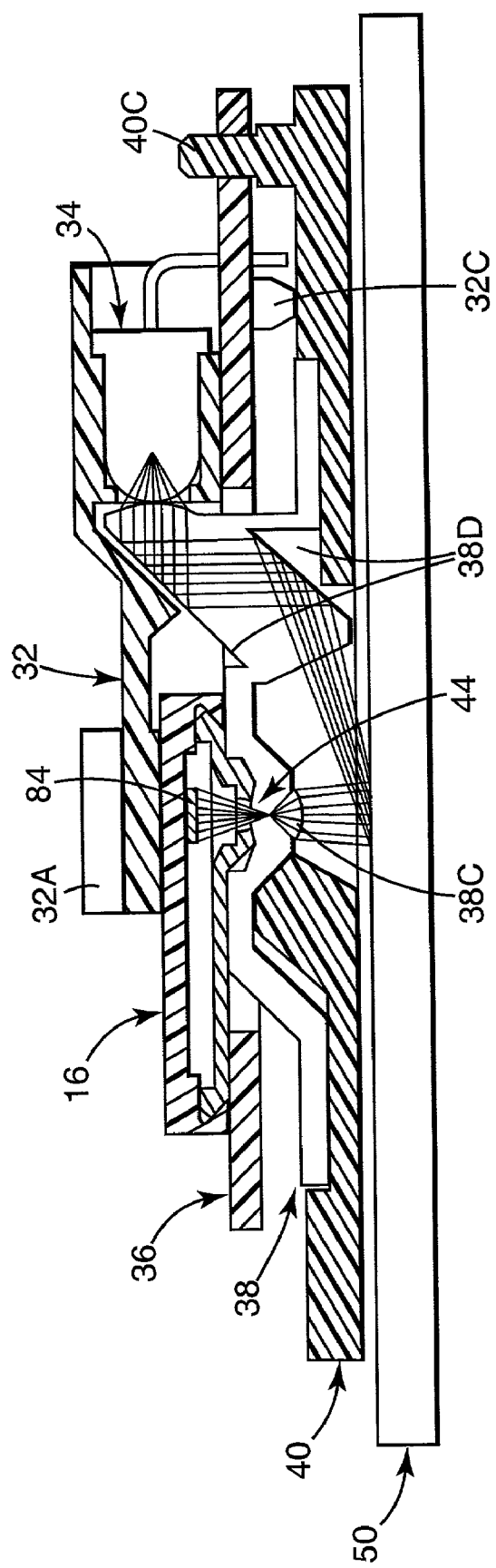
FIG. 3 is a side cross-sectional view of the internal mouse assembly illustrated in FIG. 2 after assembly, viewed along section lines 3—3 in FIG. 2.

FIG. 2 is an exploded perspective view of one embodiment of an internal mouse assembly 30 for use in optical mouse 10. Internal mouse assembly 30 includes clip 32, light emitting diode (LED) 34, optical sensor chip 16, PCB 36, lens assembly 38, and base plate 40. FIG. 3 is a side cross-sectional view of internal mouse assembly 30 after assembly, viewed along section lines 3—3 in FIG. 2.

Optical sensor chip 16 is mounted on PCB 36. A bottom surface of optical sensor chip 16 includes an array of photo detectors 84 (also referred to as pixel array 84), which is positioned over a hole 36A of PCB 36. In one embodiment, passive components (not shown) are also mounted on PCB 36 and electrically connected to optical sensor chip 16.

Clip 32 includes a cavity 32B on a bottom surface of the clip 32. LED 34 is inserted within cavity 32B of clip 32, and the leads of LED 34 are bent 90 degrees downward. Clip 32 includes two pegs 32C (only one peg is visible in FIG. 2), which are inserted in holes 36B and 36C of PCB 36. The leads of LED 34 are inserted into PCB 36 and are electrically connected through PCB 36 to chip 16. Clip 32 includes arm 32A, which, after assembly, presses against a top surface of optical sensor chip 16, thereby holding chip 16 in place against PCB 36.

After chip 16 and the other components have been mounted on PCB 36, PCB 36 is wave soldered in a no-wash solder process utilizing a solder fixture. The solder fixture is used to protect optical sensor chip 16 during the solder process. The fixture is preferably designed to expose the leads of chip 16 to solder, while shielding optical aperture 44 (shown in FIG. 3) on a bottom surface of chip 16 from direct solder contact.

Lens assembly 38 includes a base 38A, which is configured to be positioned within a recess 40A of base plate 40. Lens assembly 38 also includes a lens 38C, which is held in place by lens holder 38B. When base 38A of lens assembly 38 is positioned within recess 40A of base plate 40, lens 38C is aligned with a hole 40B in base plate 40. Lens assembly 38 also includes a prism 38D.

After base 38A of lens assembly 38 is positioned within recess 40A of base plate 40, PCB 36 is inserted over lens assembly 38 onto alignment post 40C of base plate 40. When assembled, alignment post 40C extends through hole 36D of PCB 36 to retain PCB 36 in place, and lens holder 38B and prism 38D extend through hole 36A of PCB 36. When assembled, lens 38C is aligned with optical aperture 44 of chip 16.

As illustrated in FIG. 3, prism 38D directs light emitted from LED 34, which is an IR LED in one form of the invention, onto a surface 50 that is to be imaged for navigation. In one embodiment, LED 34 is illuminated only during frame exposures. The light directed onto surface 50 is reflected to lens 38C, which directs the reflected light through optical aperture 44 of chip 16, and onto photo detector array 84 of chip 16. In one form of the present invention, in addition to having an array of photo detectors 84, chip 16 also includes memory and arithmetic circuits arranged to implement image correlation and tracking functions described herein and in the incorporated patents. Optical sensor chip 16 tracks the movement of optical mouse 10 relative to a work surface or an imaging surface 50. Optical sensor chip 16 automatically acquires and tracks any suitable image. When tracking an image, optical sensor chip 16 produces incremental (X, Y) data, which is converted by optical sensor chip 16 to USB motion data that is output to a host device.

Lifting optical mouse 10 away from surface 50 defocuses the image and produces a loss of tracking. This condition is detected within chip 16, and in one embodiment, the production of incremental (X, Y) signals ceases. This has the effect of leaving the position of a screen pointer unchanged at whatever location it currently occupies. When optical mouse 10 is subsequently replaced on surface 50, chip 16 appreciates that an image has been acquired, and, in one embodiment, treats that acquisition as though a reset has been performed. That is, until there has been new motion subsequent to the new acquisition, the incremental coordinates (X, Y) will have the value (0, 0). This leaves the existing position of the screen pointer undisturbed until such time as optical mouse 10 is deliberately moved.

Figure 4:
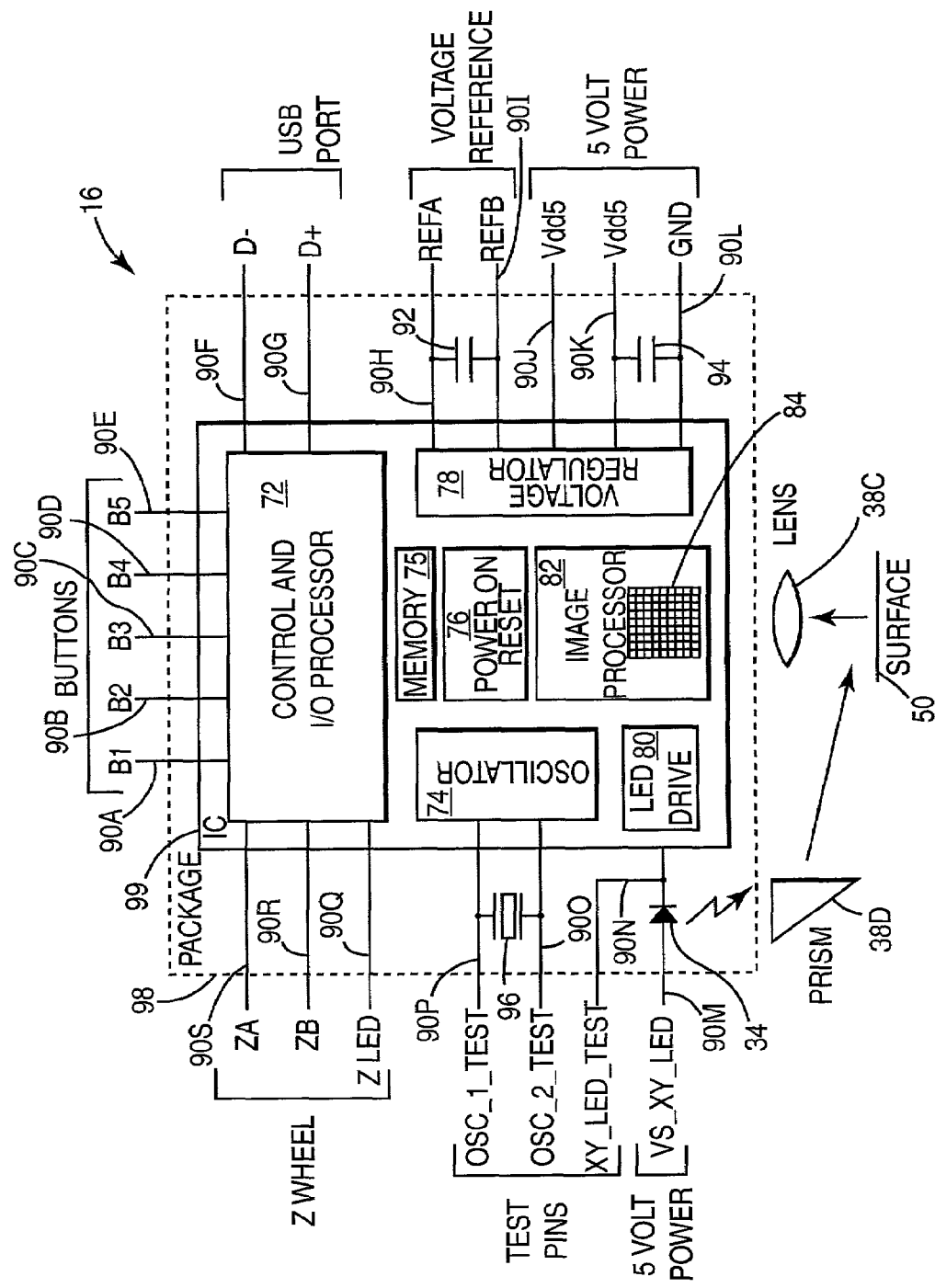
FIG. 4 is a block diagram illustrating major components of an optical motion sensor chip according to one embodiment of the present invention.

FIG. 4 is a block diagram illustrating major components of an optical motion sensor chip 16 according to one embodiment of the present invention. Optical sensor chip 16 includes integrated circuit 99 with a package 98 that is illustrated by dashed lines. Optical sensor chip 16 includes input/output pins 90A–90S (collectively referred to as pins 90), control and input/output (I/O) processor 72, oscillator 74, memory 75, power on reset circuit 76, voltage regulator 78, LED drive circuit 80, and image processor 82. Image processor 82 includes photo detector array or pixel array 84. Memory 75 includes both RAM and ROM.

Pins 90 include button pins 90A–90E, USB port pins 90F–90G, voltage reference pins 90H–90I, power pins 90J–90L, LED pin 90M, test pins 90N–90P, and Z wheel pins 90Q–90S. Button pins 90A–90E are coupled to control and I/O processor 72 and to buttons 14 on optical mouse 10. In one embodiment, not all of the button pins 90A–90E are used in optical mouse 10. Unused button pins 90A–90E are preferably tied to a 5 volt power supply (Vdd5).

USB port pins 90F–90G are coupled to control and I/O processor 72, and are configured to be coupled to a USB port of a host computer or other host device. USB port pins 90F–90G include a D– pin 90F and a D+ pin 90G. D– pin 90F and D+ pin 90G are outputs for outputting USB data to a host device. USB data is also received by chip 16 from a host device via USB port pins 90F and 90G.

Voltage reference pins 90H–90I are coupled to voltage regulator 78. Voltage reference pin 90H is also coupled to a "REFA" reference voltage, and voltage reference pin 90I is also coupled to a "REFB" reference voltage. As shown in FIG. 4, a capacitor 92 is coupled between voltage reference pins 90H and 90I. Voltage reference pins 90H–90I connect an internal 3.3V that is generated by voltage regulator 78 to bypass capacitor 92.

Power pins 90J–90L are coupled to voltage regulator 78. Power pins 90J and 90K are also coupled to a 5 volt power supply (Vdd5). Power pin 90L is also coupled to ground. As shown in FIG. 4, a capacitor 94 is coupled between power pins 90K and 90L.

LED pin 90M is coupled to LED drive circuit 80 via LED 34. LED pin 90M is also connected to a 5 volt power supply. In one form of the invention, LED drive circuit 80 strobes LED 34 once per image frame.

Test pin 90N is connected between LED 34 and LED drive circuit 80. Test pin 90N is an "XY_LED_TEST" pin that is provided for testing LED 34. Test pins 90O and 90P are coupled to oscillator 74. A resonator 96 is coupled between test pins 90O and 90P. Test pin 90P is an "OSC_1_TEST" pin, and test pin 90O is an "OSC_2_TEST" pin. Test pins 90O and 90P are provided for testing the operation of oscillator 74. In one embodiment, oscillator 74 works in conjunction with resonator 96 to provide an 18 MHz clock signal for circuitry of chip 16. For test purposes, resonator 96 may be eliminated, and chip 16 may be driven by an external clock signal driven into OSC_1_TEST pin 90P.

Z wheel pins 90Q–90S are coupled to control and I/O processor 72. Z wheel pins 90Q–90S include Z LED pin 90Q, ZB pin 90R, and ZA pin 90S. Z wheel pins 90Q–90S are provided for an optical mouse 10 that includes a Z wheel. In one embodiment, chip 16 supports 3 types of Z wheels—a standard optical Z wheel that outputs quadrature signals, a mechanical Z wheel that also outputs quadrature signals, and Logitech's one-wire Z wheel interface. Z LED pin 90Q is a control pin for a Z wheel LED in an optical Z wheel. Z LED pin 90Q is left unconnected when a purely mechanical Z wheel is used, or when no Z wheel is used. Quadrature signals are output by mechanical and optical Z wheels and received by chip 16 on ZA pin 90S and ZB pin 90R. If Logitech's one-wire Z wheel is used, the one-wire from the Z wheel is connected to ZA pin 90S, and ZB pin 90R is tied to ground. If no Z wheel is used, ZA pin 90S and ZB pin 90R are tied to ground.

Control and I/O processor 72 senses whether either or both of pins 90R and 90S are tied to ground to determine whether a Z wheel is present, and whether the Z wheel is a 2 output (quadrature) or 1 output Z wheel. Control and I/O processor 72 also senses whether any of the button pins 90A–90E are tied high (to Vdd5), indicating that the button pins are not used. Control and I/O processor 72 automatically adjusts USB descriptors based on the auto-detection of the Z wheel and the buttons.

Also shown in FIG. 4 are lens 38C, prism 38D and surface 50. As mentioned above, prism 38D directs light from LED 34 onto surface 50. The light directed onto surface 50 is reflected to lens 38C, which directs the reflected light onto photo detector array 84. The processing of image data captured by photo detector array 84 is discussed in further detail below with reference to FIG. 5.

Figure 5:
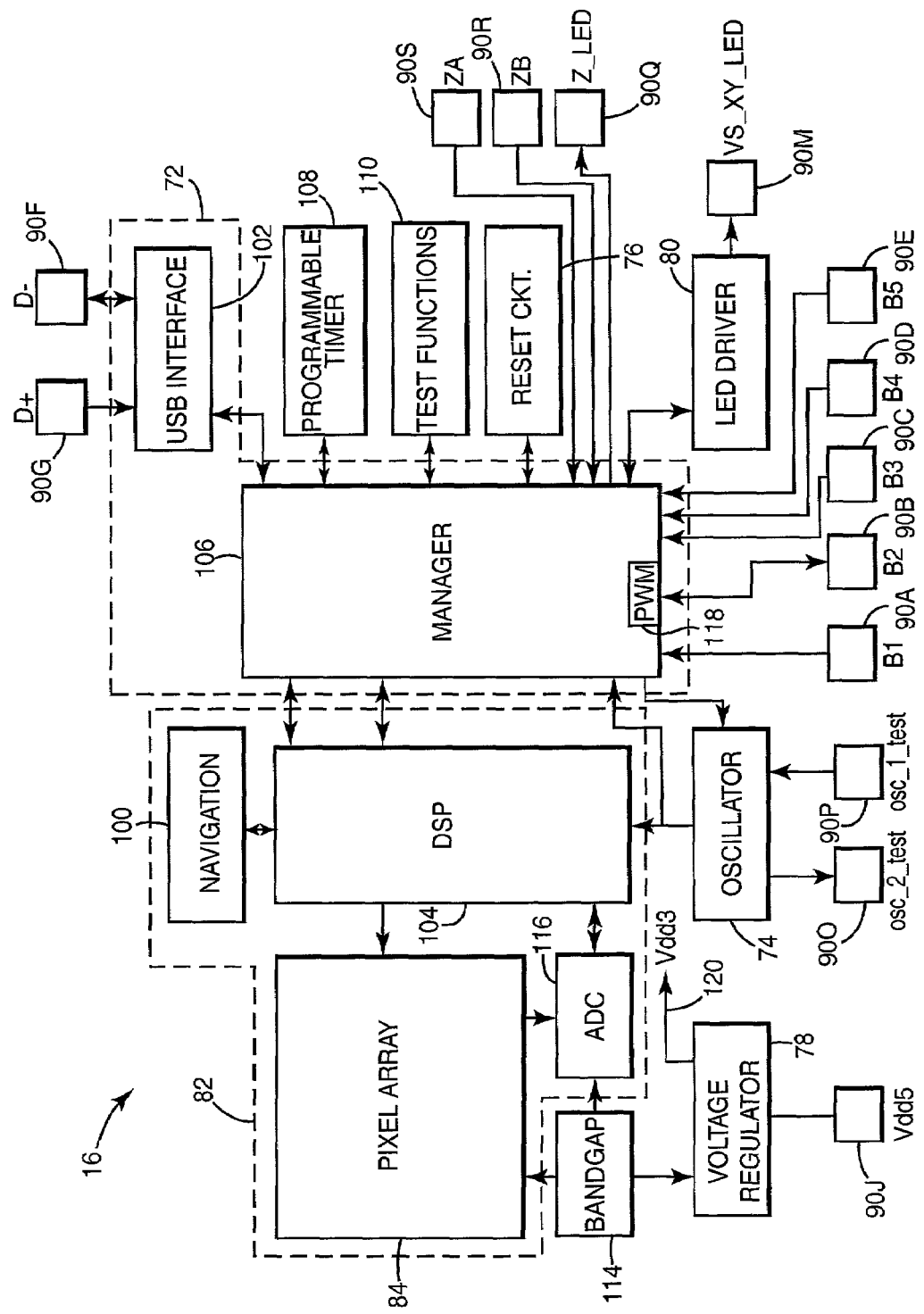
FIG. 5 is a block diagram illustrating major functional blocks of the optical motion sensor chip shown in FIG. 4.

FIG. 5 is a functional block diagram illustrating major functional blocks of optical motion sensor chip 16. As shown in FIG. 5, image processor 82 includes pixel array 84, navigation block 100, analog-to-digital converter (ADC) 116, and digital signal processor (DSP) 104. Control and I/O processor 72 includes USB interface 102 and manager 106.

A 5 volt voltage supply (Vdd5) is coupled to voltage regulator 78 via pin 90J. Voltage regulator 78 generates a nominal 3.3V for the core analog and digital circuitry in chip 16, which is represented in FIG. 5 by Vdd3 output line 120. Bandgap circuit 114 provides a reference voltage to pixel array 84, ADC 116, and voltage regulator 78.

In one embodiment, chip 16 uses exactly or substantially the same imaging and navigation techniques described in the incorporated Patents. Even though one form of an imaging and navigation mechanism is described in the incorporated Patents, a brief overview of the technique is provided below.

One preferred optical navigation technique according to the present invention optically detects motion by directly imaging as an array of pixels the various particular optical features visible at surface 50. Under the control of manager 106, LED driver 80 causes LED 34 to turn on and emit IR light. IR light reflected from a textured work surface 50 is focused onto a suitable array (e.g., 16×16 or 24×24) of photo detectors 84. In one form of the invention, pixel array 84 is a 16 by 16 grid of pixels, with each pixel including a photo-transistor with an electronic shutter. The responses of the individual photo detectors are digitized by ADC 116 to a suitable resolution (e.g., six or eight bits) and stored as a frame into corresponding locations within an array of RAM in memory 75. In one embodiment, each pixel in a frame corresponds to one of the photo detectors.

The overall size of the array of photo detectors 84 is preferably large enough to receive an image having several features. In this way, images of such spatial features produce translated patterns of pixel information as optical mouse 110 is moved over surface 50. The number of photo detectors in the array 84 and the frame rate at which image data is captured and digitized cooperate to influence how fast optical mouse 10 can be moved over surface 50 and still be tracked. Tracking is accomplished by DSP 104, which compares a newly captured sample frame with a previously captured reference frame to ascertain the direction and amount of movement. In one form of the invention, prior to comparing frames, DSP 104 subtracts background light intensity variations using a digital high pass filter, and also determines shutter and flash values to be used for the next frame to be captured.

In one embodiment, in order to extract navigation information from frames, the entire content of one of the frames is shifted by DSP 104 by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted by DSP 104 on a pixel by pixel basis, and the resulting differences are preferably squared and then summed to form a measure of similarity (correlation) within that region of overlap. Larger trial shifts are possible, of course (e.g., two over and one down), but at some point the attendant complexity ruins the advantage, and it is preferable to simply have a sufficiently high frame rate with small trial shifts. The trial shift with the least difference (greatest correlation) can be taken as an indication of the motion between the two frames. That is, it provides raw movement information that may be scaled and or accumulated to provide screen pointer movement information (ΔX and ΔY) of a convenient granularity and at a suitable rate of information exchange. Extracted navigation information is represented in FIG. 5 by navigation block 1100. In one embodiment, navigation information is stored in memory 75.

DSP 104 automatically detects when optical mouse 10 has been removed from surface 50, by sensing that all or a majority of the pixels in the image have "gone dark." The process is actually somewhat more complicated than that, as explained below.

When optical mouse 10 is removed from surface 50, the IR light from the illuminating LED 34 no longer reaches the photo detectors in the same quantity that it did previously, if at all; the reflecting surface 50 is too far away or is simply not in view. However, if optical mouse 10 is removed and the pixel array 84 is exposed to an intensely lit environment as a result, then the outputs of the photo detectors might be at any level. The key is that the outputs of the photo detectors will be uniform, or nearly so. The main reason that the outputs become uniform is that there is no longer a focused image. All of the image features are indistinct and they are each spread out over the entire collection of photo detectors. Therefore, the photo detectors uniformly come to some average level. This is in distinct contrast with the case when there is a focused image. In the focused case, the correlations between frames (recall the one over, one over and one down, etc.) exhibit a distinct phenomenon.

In operation, images should be acquired at a rate sufficient that successive images differ in distance by no more that perhaps a quarter of the width of the array, or 4 pixels for a 16×16 array of photo sensors. In one embodiment, chip 16 supports rates of motion of up to 14 inches per second.

The ΔX and ΔY relative displacement values calculated by DSP 104 are provided to manager 106, which converts the displacement values to USB motion data. Manager 106 communicates with a host device through USB interface 102. In one embodiment, manager 106 and USB interface 102 support USB communications that meet the USB Revision 1.1 Specification. In addition to providing motion data to the host device through USB interface 102, manager 106 also manages other types of USB communications with the host device, including providing button press information received on button pins 90A–90E, and providing Z wheel information received on Z wheel pins 90Q–90S.

In one embodiment, chip 16 utilizes a single pico-processor to perform the digital signal processing functions, navigation functions, input/output functions, and other chip management functions described herein. Memory 75 includes ROM for storing firmware that is executed by the pico-processor. Chip 16 can be programmed by modifying the registers of the pico processor via USB interface 102, and configuration, motion and other data can be read from the processor registers via USB interface 102. In one form of the invention, chip 16 has a selectable resolution of either 400 counts per inch (cpi) or 800 cpi. The default resolution is 400 cpi, but may be changed through USB interface 102 after power-up.

In one embodiment, chip 16 includes an orientation register stored in memory 75 that indicates the orientation of chip 16 within optical mouse 10. As shown in FIG. 1, a longitudinal axis of chip 16 is aligned with a longitudinal axis of mouse 10, which is the default orientation for chip 16. Chip 16 may alternatively be rotated counterclockwise 90 degrees (in the plane of the paper), and mounted in this rotated configuration. If the orientation register indicates that chip 16 is in the rotated position, rather than the default position, DSP 104 appropriately manipulates the X and Y motion data so that correct motion information is reported from chip 16. In one embodiment, the orientation register is programmable through USB interface 102. In an alternative embodiment, one of button inputs 90A–90E is used to indicate the orientation of chip 16. A specified one of the button inputs 90A–90E is tied high, low, or to a specified intermediate state, which provides an indication of the orientation of chip 16. Manager 106 senses the state of the specified button input at power-up to determine the orientation of chip 16.

Various test modes and test features of chip 16 can be accessed by a host device via USB interface 102. Test functionality is represented in FIG. 5 by test functions block 110. In one embodiment, test functions 110 for chip 16 are pre-coded operations stored in ROM of memory 75, and include analog tests for internal voltage measurements and testing of ADC 116; digital tests for testing operation of the digital circuitry including inserting a predetermined digital image set and checking whether the resulting navigation conclusions are correct; and low power tests.

Manager 106 is also coupled to programmable timer 108 and reset circuit 76. In one form of the invention, chip 16 includes two power saving modes—a sleep mode and a suspend mode. The sleep mode is initiated when no motion is detected for a period of one second. After chip 16 has entered sleep mode, chip 16 periodically goes into normal mode, looks for motion, and if none is detected, goes back into sleep mode. If motion is detected, chip 16 stays in normal mode. During sleep mode, LED 34 is powered off. Sleep mode may be turned off via a command through USB interface 102. Chip 16 can be placed in a suspend mode via a command through USB interface 102. In suspend mode, LED 34 and oscillator 74 are turned off, and all analog circuitry except bandgap 114 and voltage regulator 78 are powered down. Chip 16 can come out of the suspend mode by any activity on the USB pins 90F and 90G, button pushes, Z wheel motion, and mouse motion. Programmable timer 108 may also be used to wakeup chip 16 from a suspend mode after a programmable time delay. Programmable timer 108 is programmed via USB interface 102. In one embodiment, programmable timer 108 is disabled as a default, and must be explicitly enabled through USB interface 102.

Reset circuit 76 is coupled to the 5 volt power supply (Vdd5) powering chip 16, and to the 3.3 volt supply (Vdd3) generated by voltage regulator 78 and output on line 120. Based on sensed voltages from these supplies, reset circuit 76 provides a reset signal to manager 106, which distributes the reset signal to the rest of the chip 16. During power up, reset circuit 76 and manager 106 maintain the digital circuitry in a reset state until Vdd3 is high enough to power the digital circuitry. Reset circuit 76 also performs a hard reset if Vdd5 drops below a specified threshold.

As mentioned above, pin 90B (B2) is a button input. In one embodiment, pin 90B also functions as a pulse width modulation (PWM) output pin for controlled vibration of optical mouse 10 to provide feedback to the user.

It will be understood by a person of ordinary skill in the art that functions performed by optical motion sensor chip 16 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Optical sensor chip 16 may be implemented in an optical mouse for a desktop personal computer, workstation, or portable computer. Optical sensor chip 16 may also be implemented in an optical trackball, an integrated input device, or other pointing device.

In one form of the invention, optical sensor chip 16 provides a single chip solution for an optical pointing device, rather than the multiple chips used in prior art devices. The single optical sensor chip 16 is less expensive and approximately 50% of the size of existing 2 chip solutions. The single chip 16 uses less pins than the existing two chip solution, and there is no need for interconnections between chips, which results in increased reliability. A complete optical mouse can be constructed using the single chip 16 having a single processor, and the mouse manufacturer need only add a few passive components, a cable, some plastic, and some buttons.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus for controlling the position of a screen pointer for an electronic device having a display screen, the apparatus comprising:
   a light source for illuminating an imaging surface, thereby generating reflected images;
   a single chip for receiving the reflected images, generating digital representations of the reflected images, generating a first set of movement data based on the digital representations of the reflected images, the first set of movement data indicative of relative motion between the chip and the imaging surface, the single chip including a serial interface for outputting motion data in a serial format based on the movement data;
   wherein the serial interface is configured to be coupled to a host device, and the single chip is configured to provide testing information about the chip to the host device through the serial interface.

2. The apparatus of claim 1, wherein the apparatus is an optical mouse.

3. The apparatus of claim 1, wherein the serial interface is a Universal Serial Bus (USB) interface.

4. The apparatus of claim 1, wherein the single chip is configured to receive button press information identifying a button that has been pressed on the apparatus.

5. The apparatus of claim 4, wherein the single chip is configured to output the button press information in a serial format through the serial interface.

6. The apparatus of claim 1, wherein the single chip is configured to receive Z wheel information indicative of movement of a Z wheel on the apparatus.

7. The apparatus of claim 6, wherein the single chip is configured to output the Z wheel information in a serial format through the serial interface.

8. The apparatus of claim 1, wherein the single chip is configured to receive orientation information indicating a mounting orientation of the single chip.

9. A method of controlling the position of a screen pointer for an electronic device having a display screen, the method comprising:
   illuminating an imaging surface, thereby generating reflected images;
   directing the reflected images onto an electronic chip, the electronic chip including an array of photo detectors;
   digitizing output values of the photo detectors with the electronic chip, thereby generating digital representations of the reflected images;
   correlating at least one version of a first one of the digital representations with at least one version of a second one of the digital representations using circuitry on the electronic chip;
   generating with the electronic chip a first set of motion data based on the correlation, the first set of motion data indicative of relative motion in orthogonal axes between the electronic chip and the imaging surface;
   outputting movement data in a serial format from the electronic chip based on the generated motion data;
   adjusting the position of the screen pointer in accordance with the movement data; and
   outputting test information from the electronic chip in the serial format to a host device, the test information including results of internal tests performed by the electronic chip.

10. The method of claim 9, wherein the electronic chip is incorporated in an optical mouse.

11. The method of claim 9, wherein the serial format is a Universal Serial Bus (USB) format.

12. The method of claim 9, and further comprising:
    receiving button press information with the electronic chip, the button press information identifying a button coupled to the electronic chip that has been pressed; and
    outputting the button press information from the electronic chip in a serial format.

13. The method of claim 9, and further comprising:
    receiving Z wheel information with the electronic chip, the Z wheel information indicative of movement of a Z wheel coupled to the electronic chip; and
    outputting the Z wheel information from the electronic chip in a serial format.

14. An electronic chip for use in an apparatus for controlling the position of a screen pointer, the electronic chip comprising:
    an array of photo detectors for receiving reflected light from an imaging surface;
    an analog to digital converter coupled to the array of photo detectors for generating digital image data based on outputs of the photo detectors;
    a controller coupled to the analog to digital converter, the controller configured to generate a first set of movement data based on the digital image data, the first set of movement data indicative of relative motion between the electronic chip and the imaging surface; and
    a serial interface coupled to the controller for outputting motion data based on the generated movement data in a serial format, wherein the serial interface is configured to be coupled to a host device, and the electronic chip is configured to provide testing information about the chip to the host device through the serial interface.

15. The electronic chip of claim 14, wherein the apparatus is an optical mouse.

16. The electronic chip of claim 14, wherein the serial interface is a Universal Serial Bus (USB) interface.

17. The electronic chip of claim 14, wherein the electronic chip is configured to receive button press information identifying a button that has been pressed on the apparatus, and wherein the electronic chip is configured to output the button press information in a serial format through the serial interface.

18. The electronic chip of claim 14, wherein the electronic chip is configured to receive Z wheel information indicative of movement of a Z wheel on the apparatus, and wherein the electronic chip is configured to output the Z wheel information in a serial format through the serial interface.

19. The electronic chip of claim 14, wherein the controller is a pico-processor.

20. The electronic chip of claim 14, wherein the first set of movement data generated by the controller is also based on orientation information indicating a mounting orientation of the electronic chip within the apparatus.

* * * * *